March 15, 1966  G. A. SMITH  3,240,400
DRY DETERGENT FEEDER
Filed Dec. 23, 1963

INVENTOR
Gail A. Smith
BY *Bernhard R. Swick*
ATTORNEY

United States Patent Office 3,240,400
Patented Mar. 15, 1966

3,240,400
DRY DETERGENT FEEDER
Gail A. Smith, Trenton, Mich., assignor to Wyandotte Chemicals Corporation, Wyandotte, Mich., a corporation of Michigan
Filed Dec. 23, 1963, Ser. No. 332,650
6 Claims. (Cl. 222—254)

This invention relates to dispensers for powdered materials which will not easily flow down an inclined surface and which tend to bridge rather than flow.

While it is known to dispense dry powdered chemical materials such as cleaners, soaps, etc., the prior art devices generally employ a container or hopper having a conical bottom portion and an opening at the apex of the cone. A helical conveyor-type device for forcing the bottom material out may also be employed.

Such devices have certain inherent disadvantages when employed with powders which will not easily flow down an inclined surface, since in such devices the material tends to bridge over in the conical portion and thus is not discharged and the mere presence of an auger or other device at the outlet itself does not remedy this situation. To assist in dispensing such materials, often agitators such as central shafts with agitating arms extending through the material may be employed to loosen up the material and thus permit it to eventually flow out of the container. However, such agitation of substantially the entire body of the powder necessarily produces aeration and when the powder is permitted to drop from the discharge opening, this degree of aeration is greatly increased. Thus the powder deposited is of much less density than the powder in the container. This has a substantial disadvantage since it is difficult if not impossible to maintain a constant and predictable rate of feed. Further, where the materials are of varying particle size, agitation of substantially the entire body of the powder tends to classify the material according to particle size and thus the distribution of particle sizes of the material being dispensed will vary over a period of time.

Accordingly, it is a purpose of this invention to provide for dispensing powdered material such as soap and chemical cleaners of the type which will not easily flow down an inclined surface wherein the material is not unduly agitated or aerated and where the dispensing device does not tend to classify materials of varying particle size according to particle size.

This invention is best described with reference to the accompanying drawings wherein.

Figure 2:
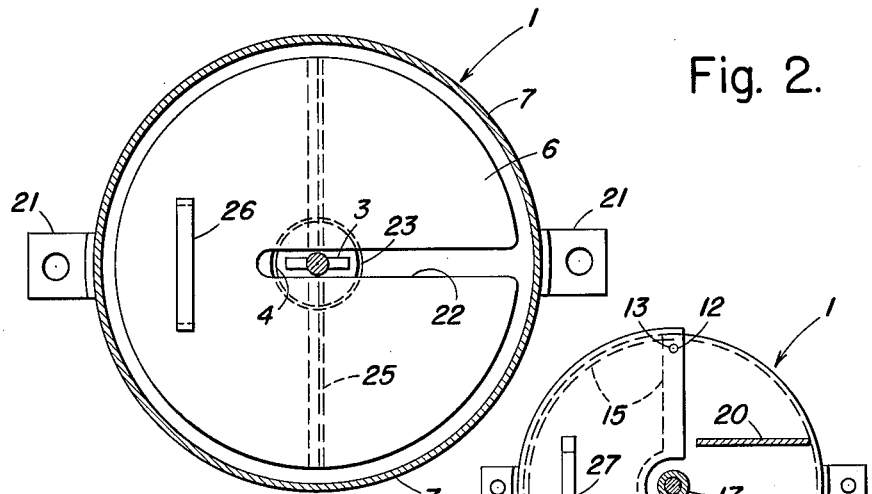
FIGURE 2 is a plan view in section of the dispensing apparatus of FIGURE 1 taken along the line 2—2 of FIGURE 1.
Figure 3:
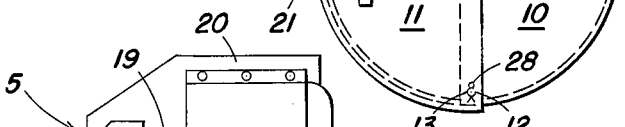
FIGURE 3 is a plan view of the dispensing apparatus of FIGURE 1 taken along the line 3—3 of FIGURE 1.
Figure 1:
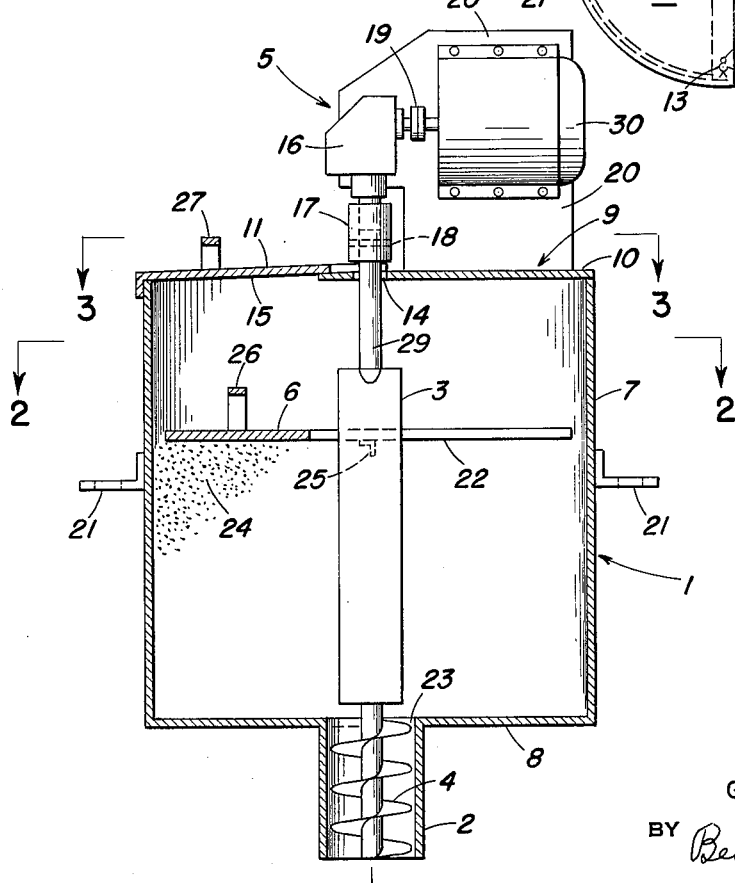
FIGURE 1 is an elevational view in section of a presently preferred dispensing apparatus, embodying the principles of this invention.

With reference more particularly to the drawing, it will be seen that the dispensing device comprises a flat-bottom container 1 manufactured from a suitable material such as steel, stainless steel, aluminum etc.; a centrally disposed vertical cylindrical feed casing 2 extending downward from the bottom of container 1 and in open communication with container 1; a shaft 3 of rectangular cross-section extending down into the container and substantially to the bottom thereof; an auger feeder 4 mounted coaxially on the lower end of shaft 3 and within the feed casing 2; means 5 for rotating the shaft and means such as a plate member 6 which may be provided with vertical blades 25 on the bottom surface thereof adapted to contact the upper surface of any material in said container and which follows the surface downward as the material is dispensed.

In a preferred embodiment of this invention, the container 1 is cylindrical and comprises a tubular member 7 and a closure member such as a circular plate 8 affixed to the lower end of the tubular member by suitable means such as welding. The upper end of the tubular member is provided with closure means 9 which comprises a plate member 10 affixed to the tubular member by suitable means such as welding and a removable cover member 11. Plate member 10 covers only a little more than one-half the upper end of tubular member 7 and thus plate member 10 and the portion of the upper edge of tubular member 7 to which plate member 10 is not affixed define an opening 15. Cover member 11 is of a suitable size and shape as shown in the drawings to cover opening 15.

The cover member 11 is maintained in position by suitable means such as pin members 12 affixed to the plate member 10 of the container by suitable means such as welding and matching openings 13 in cover 11. To insure that the cover member 11 is maintained in position, a device such as a cotter pin 28 may be passed through an opening (not shown) provided in one or both pin members 12. In a preferred embodiment only one cotter pin 28 is employed and when it is desired to uncover the opening 15 of container 1, the end of cover member 11 furthest removed from cotter pin 28 is raised to disengage the respective opening 13 therein from its corresponding pin member 12 and the cover member is pivoted around the pin member 12 having the cotter pin 28 to a position where opening 15 is completely clear. A handle 27 may be provided on cover 11 to facilitate removal of the cover 11.

The vertical cylindrical feed casing 2 is axially mounted on the bottom of container 1, i.e. the cylindrical container 1 and the cylinder feed casing 2 have a common axis. The cross-sectional area of the feed casing 2 is preferably from about $\frac{1}{10}$ to $\frac{1}{3}$ the cross-sectional area of the container 1. A round opening 23 of the same diameter as the inside of feed casing 2 and coinciding therewith is provided in plate 8 to provide communication between container 1 and feed casing 2.

The shaft 3 which has a rectangular cross-section for a major portion of its length extends down along the axis of container 1, i.e. shares a common axis with container 1. The term "rectangular" as used herein includes a rectangle with unequal sides as shown in the drawing and a rectangle with equal sides, i.e. a square. The maximum width of shaft 3 must be less than one-half the width of container 1 and preferably from about $\frac{1}{10}$ to $\frac{1}{3}$ the width of container 1 to avoid excessive aeration of the powdered material and to avoid classification of powdered material having different particle sizes.

The upper end 29 of the shaft 3 is round in cross-section to permit the shaft to pass through and rotate within a round opening 14 in the plate member 10 and also to permit removal of plate 6 from the container 1 without rotating the shaft 3. Shaft 3 may be fabricated from a round rod and a bar having a rectangular cross-section, both of suitable material such as steel, stainless steel, aluminum, etc., joined together by suitable means such as welding to form the round and rectangular portions, respectively. The auger 4 is affixed to the lower end of shaft 3 by suitable means such as welding.

Plate 6 is preferably a circular plate member adapted to contact substantially the entire upper surface of any powdered material 24 in container 1. Plate member 6 is adapted to constantly apply a downward force to the powdered material 24. Preferably, this is accomplished by allowing plate member 6 to rest on the surface of the material 24 whereby the applied force is the force of gravity on plate member 6. Since plate member 6 rests on the surface of the material 24, it will follow the surface of the powdered material downward as the powdered material is dispensed. In order to allow for shaft 3 a slot 22 is provided in plate member 6 which slot extends to one edge of plate member 6 and is of sufficient width to permit passage of the round portion and the shortest width of the rectangular portion of shaft 3 therethrough. However, the slot 22 is narrower than the maximum width of the rectangular portion of shaft 3 whereby when the plate is in operating position as shown in the drawing it rotates with rotation of shaft 3.

Removal of plate 6 is accomplished by sliding plate 6 up to a point above the portion of the shaft 3 having a rectangular cross-section, i.e. to the portion of the shaft which is round in cross-section and then rotating the plate to the position whereby, due to the fact that one end of slot 22 extends to the edge of plate 6, the plate 6 may be easily removed, without interference from shaft 3 through the opening 15 after removal of cover member 11. A suitable handle 26 may be provided on plate 6 to facilitate removal and replacement of plate 6.

The means 5 for rotating the shaft 3 may comprise drive means such as an electric motor 30, a conventional reduction gear mechanism 16, a coupling 17 employing a shear pin 18 for coupling the upper end of the shaft 3 to the gear mechanism 16. A coupling 19 is provided to couple the gear mechanism to the shaft of the motor 30. The motor is mounted on a suitable member such as a vertical plate 20, which in turn is mounted on member 10 by suitable means such as welding. Preferred means for mounting the motor is by bolting the motor to the plate 20. The gear mechanism 16 is also mounted on plate 20 by suitable means such as bolting and the shaft 3 is supported from gear mechanism 16 through coupling 17.

In order to mount the feeder device of this invention over a tub, washing machine or in any other location for dispensing the powdered material, suitable members such as lugs 21 may be provided on the sides and affixed thereto by suitable means such as welding. The lugs 21 may then be mounted on and bolted to suitable structural members or other means which are provided in the desired location.

The method embodying the principles of this invention and the operation of the apparatus described above and shown in the drawing is as follows:

The cover member 11 is first removed or swung away from the opening 15 in container 1 and then the plate 6 is removed by sliding the plate to a position where the slot 22 and the plate itself are above the rectangular portion of the shaft 3. The plate 6 is then rotated to the position wherein it can be easily removed from the container through opening 15. A body of the powdered material 24 is then charged into the container through opening 15 to substantially fill the container. However, the level of the upper surface of the material should not be above the rectangular portion of shaft 3. The plate 6 is then replaced by engaging the slot 22 of plate 6 with the round portion of the shaft 3 and sliding the plate into the container. The plate 6 is then rotated about shaft 3 until the slot 22 is in line with the rectangular portion of the shaft 3 whereupon the plate is allowed to descend and rest on the upper surface of the powdered material. The cover member 11 is then replaced.

The shaft 3 is rotated by means of motor 30 through the gear mechanism 16 and couplings 17 and 19. As can be seen in the drawing, shaft 3 rotates in the central portion of the container, the walls of which container define a chamber. The material is discharged from the bottom of the chamber through opening 23 below rotating shaft 3 by the action of the helical surface of the auger 4 within the tubular surface of the feed casing 2.

The upper surface of the powdered material 24 is compressed by the action of gravity on plate 6. The action of the rectangular shaft 3 is to loosen the powder in the zone contacted by the shaft. This is a relatively narrow zone and thus rotation of shaft 3 does not have the effect of aerating the material or classifying the particles the way a conventional-type agitator having arms extending through a substantial portion of the material would. However, the rectangular portion of shaft 3 does loosen the powder in the adjacent area, whereby the material falls down to the auger and is in turn forced out by the auger. Where the powders may tend to harden or bridge, the action of the plate 6 and the blades 25 affixed thereto, which plate rotates with the rotation of shaft 3, loosens the material in contact therewith and applies pressure thereto whereby new material is forced into contact with shaft 3 to replace the discharged material.

It is to be understood that various changes and modifications may be made in the foregoing apparatus and method of operation without departing from the spirit of the invention and scope of the appended claims.

I claim:

1. A dispensing device for powdered materials which will not easily flow down an inclined surface wherein the material is not unduly agitated or aerated and the dispensing device does not tend to classify materials of varying particle size according to particle size, comprising a flat-bottom container, a centrally disposed vertical cylindrical feed casing extending downward from the bottom of said container and in open communication therewith, a shaft of rectangular cross-section extending down into the container and substantially to the bottom thereof, the maximum width of said shaft being greater than one-tenth and less than one-half the width of said container, an auger feeder mounted coaxially on the lower end of said shaft and within said feed casing, means for rotating said shaft and means adapted to contact the upper surface of any material in said container which means is adapted to follow said surface downward as the material is dispensed.

2. The apparatus of claim 1 wherein said means contacting the upper surface of said powdered material is a plate member which is adapted to constantly apply a downward force to said material.

3. In a dispensing device for powdered materials which will not easily flow down an inclined surface comprising a cylindrical flat-bottom container, an axially mounted vertical cylindrical feed casing extending downward from the bottom of said container and in open communication therewith, a shaft of rectangular cross-section extending down along the axis of said container into the container and substantially to the bottom thereof, the maximum width of said shaft being less than one-half the width of said container, an auger feeder mounted coaxially on the lower end of said shaft and within said feed casing, means for rotating said shaft, a circular plate member provided with blade members affixed to the bottom surface thereof, said plate member being adapted to contact substantially the entire upper surface of any powdered material in said container, which plate member is adapted to constantly apply a downward force to said powdered material and is adapted to rotate with rotation of said shaft and to follow said surface of said powdered material downward as the powdered material is dispensed.

4. The apparatus of claim 3 wherein the maximum width of said shaft is from about 1/10 to 1/3 the width of said container.

5. The apparatus of claim 4 wherein the cross-sectional area of said vertical feed casing is from about 1/10 to 1/3 the cross-sectional area of said container.

6. A dispensing device for powdered materials which will not easily flow down an inclined surface comprising a flat-bottom container, a centrally disposed vertical cylindrical feed casing extending downward from the bottom of said container and in open communication therewith, a shaft of rectangular cross-section extending down into the container and substantially to the bottom thereof, the maximum width of said shaft being less than one-half the width of said container, an auger feeder mounted co-axially on the lower end of said shaft and within said feed casing, means for rotating said shaft and a plate member provided with blade members affixed to the bottom surface thereof, said plate member being adapted to contact the upper surface of any material in said container, constantly apply a downward force to said material, follow said surface of said powdered material downward as the powdered material is dispensed and rotate with rotation of said shaft.

References Cited by the Examiner

UNITED STATES PATENTS

| | | | |
|---|---|---|---|
| 1,311,227 | 7/1919 | Hartman | 222—241 |
| 1,452,585 | 4/1923 | Adams | 222—241 X |
| 1,677,709 | 7/1928 | Cousins | 222—260 X |
| 2,531,305 | 11/1950 | Smith | 222—185 |

M. HENSON WOOD, JR., *Primary Examiner.*

LOUIS J. DEMBO, *Examiner.*